UNITED STATES PATENT OFFICE.

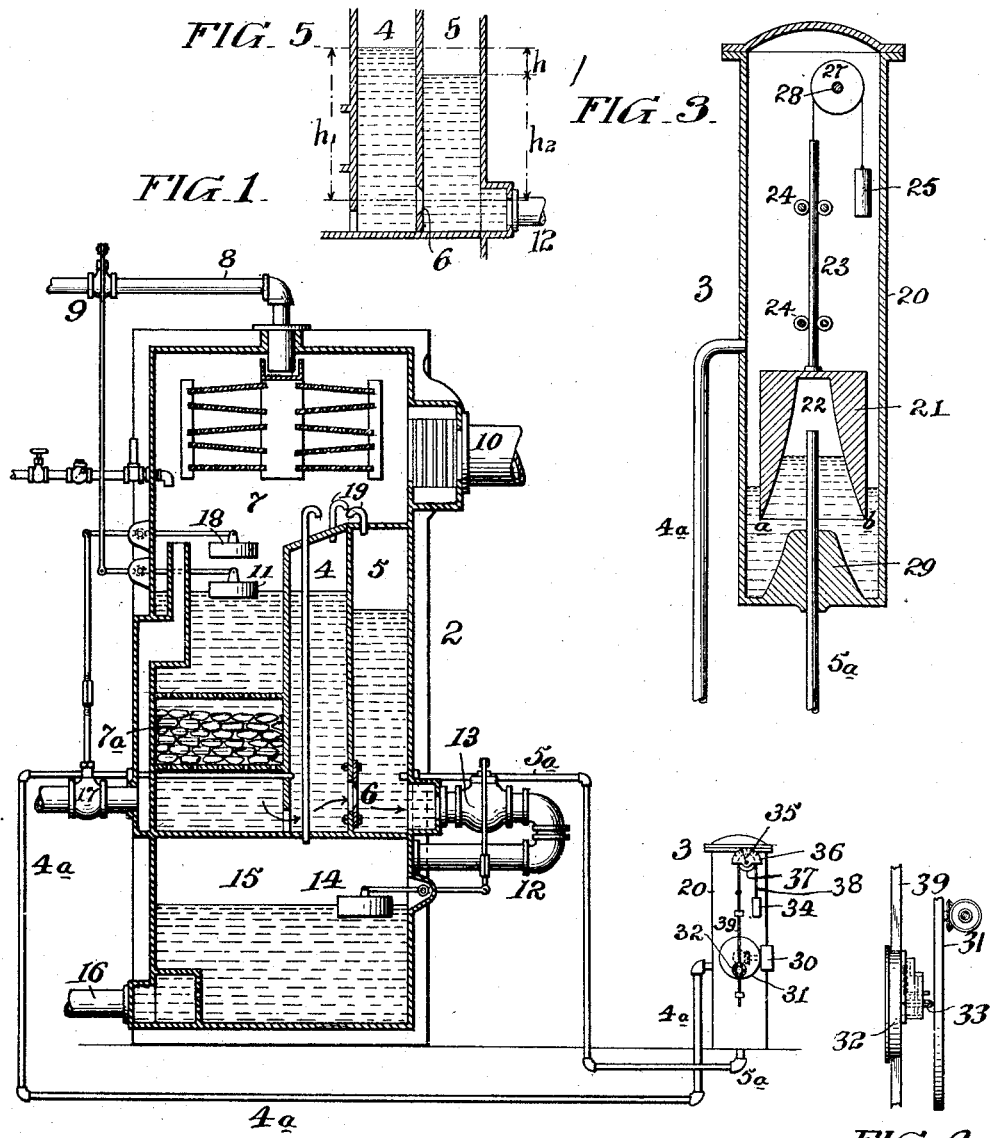

WILLIAM F. BILYEU, OF RIVERTON, NEW JERSEY, ASSIGNOR TO WARREN WEBSTER & COMPANY, A CORPORATION OF NEW JERSEY.

APPARATUS FOR MEASURING FEED-WATER, &c.

1,226,847.  Specification of Letters Patent.  Patented May 22, 1917.

Application filed January 21, 1914. Serial No. 813,385.

*To all whom it may concern:*

Be it known that I, WILLIAM F. BILYEU, citizen of the United States, and resident of Riverton, county of Burlington, and State of New Jersey, have invented an Improvement in Apparatus for Measuring Feed-Water, &c., of which the following is a specification.

The object of my invention is to provide a feed water heater or other fluid treating device, with means for automatically measuring the feed water or fluid passing through the same.

In carrying my improvements into practice, I cause the water within the heater to pass from one compartment into another through a partition having a wholly submerged orifice of definite proportions, the conditions of said flow being governed by the static heads in the respective compartments modified by the supply of water to the compartment having the greater static head and the withdrawal of water from the compartment having the lesser static head, and automatically indicating or registering the quantity of the water which flows through the submerged orifice in a given time.

My invention consists of two water containing compartments of the heater, one for receiving water and the other for supplying it, said compartments having a communicating submerged orifice of definite dimensions, and said compartments separated by dividing walls so as to be capable of providing static heads furnishing different pressures, combined with means for automatically indicating or registering the quantity of water flowing through the submerged orifice during any given period under the influence of the differential pressure due to the static heads.

More broadly, my invention consists in an apparatus having head and tail compartments provided with a communicating orifice of constant area at their lower parts, the head compartment being arranged to receive the fluid to be measured and the tail compartment arranged to discharge the fluid to be measured, said fluid being caused to pass through the communicating orifice while at all times maintaining static heads in the two compartments, combined with means communicating with the respective compartments and affected by the respective static heads therein for registering the quantity of flow of fluid through the submerged orifice in any given time due to the difference in the static heads.

My invention also comprehends details of construction which, together with the features above specified, will be better understood by reference to the drawings, in which:—

Figure 1 is a sectional elevation of a feed water heater having my improved water measuring devices applied thereto; Fig. 2 is an elevation of the orifice portion of the measuring device; Fig. 3 is a sectional elevation of one form of means for indicating and registering the quantity of flow; Fig. 4 is a detail thereof; and Fig. 5 is a diagram indicating the difference in the static heads upon which the flow is dependent and as used in the equations.

2 is the feed water heater, through which the water to be measured flows, and 3 is the indicating and registering mechanism for indicating and registering the amount of said flow of water. The general construction of the heater may be greatly varied, but for purpose of explanation of my invention, I have shown a form of feed water heater very well suited to the use of my improvements. The heater contains a "head" water compartment 4 and a "tail" water compartment 5, said compartments being in communication near the bottom or lower portion by an orifice 6 of fixed or constant area, suitably proportioned for the quantity of the flow to be handled. This orifice 6 may be in a thin plate $6^a$ (Fig. 2), and if desired, the edge of the orifice may be devoid of appreciable thickness. The "head" compartment 4 is in communication, at or near its bottom, with the receiving chamber 7 by a suitable opening; and this compartment 7 may be provided with a filter $7^a$, if so desired. The water is supplied to the receiving chamber 7 by the supply pipe 8 having the control valve 9, and is discharged as spray water, in which form it meets the inflowing exhaust steam from inlet 10, and becomes heated. The valve 9 is controlled by a float 11, which mechanism maintains a substantially constant water level in chamber 7 and "head" compartment 4. Should, from any cause, an excess of water be had in the chamber 7, it will overflow and be discharged through the overflow valve 17, which is automatically opened by a float 18. The "head" and "tail" compartments 4 and 5 may have small vent pipes 19 venting their upper ends into the chamber 7 so as not to interfere with any tendency to change the static heads therein.

Below the above described compartments 4 and 5 and the receiving chamber 7, is preferably arranged, a reservoir chamber 15 having at its bottom an outlet 16 leading to the pump for feeding the boiler (not shown), and having its upper portion connected with the "tail" compartment 5 by a pipe 12, the flow through which is controlled by a valve 13 operated by a float 14 in the reservoir chamber 15. By these means, the water is supplied to the reservoir chamber in such manner that it is always kept full to approximate level and does not allow the suction pulsations of the pump to affect the "tail" water in compartment 5 adversely. By supplying the "head" compartment 4 with water from chamber 7 through a passage at its bottom, the said "head" water is not affected by disturbances in the incoming feed water. The object of my invention is to have the water in the compartments 4 and 5 as quiescent as possible, consistent with normal flow transversely at the bottom.

Opening from the "head" compartment 4, preferably near its lower portion, is a pressure tube $4^a$; and opening from the "tail" compartment 5 on the same level, is a pressure pipe $5^a$. It is manifest that, as these pipes $4^a$ and $5^a$ open from the compartments 4 and 5 on the same level, the pressures therein will be proportional to the static heads of water in said respective compartments, and the flow between the compartments will be dependent upon and proportional to the difference of these static heads or levels in the two compartments. The static head in compartment 4 may be approximately constant, though this is not assured as there is possible variation in the water level due to the low water level of float 11 and high water or overflow level. By having the low water level float 11 nearer to the overflow level, there will be less variation in the level of the water in compartment 4. The objection to this is, however, the danger of losing hot feed water by undesirable overflow and loss in efficiency of the heater. I therefore do not desire to be understood as requiring a constant level of water in compartment 4, as said level may vary within wide limits if found useful or desirable, without departing from the requirements of my invention. The level of the water in the compartment 5 will vary according to the amount of feed water drawn off from reservoir chamber 15, and should a sudden demand be had the head in compartment 5 may drop very considerably to provide a differential which will insure a more speedy flow through the orifice 6. The outlet 16 to the boiler feed pump is greater than the orifice 6 so that the flow during the operation of the pump insures a difference in the static heads in the head compartment 4 and tail compartment 5. During the operation of the pump on the pipe 16, the valve 13 will become wide open due to the lowering of the level of water in the reservoir chamber 15. There is no time during the flow of water through the orifice 6 that there is not a difference in static heads of the two compartments 4 and 5. The valve 13 opens fully or closes fully according as to whether the suction pump is in or out of operation in its usual intermittent action. When the valve opens fully the rate of flow through the orifice 6 is proportional to the difference in the static heads of compartments 4 and 5; and when the opening or closing of the valve 13 is taking place the flow is still proportional to the difference in the static heads, though gradually slowing with the closing of valve 13 and gradually increasing with the opening of said valve.

The indicating and registering devices 3 may be of any suitable construction, and in general comprises a float which floats in mercury, the pressure of the static head of compartment 4 being communicated by pipe $4^a$ to the float chamber outside of the float and the pressure of the static head of "tail" compartment 5 being communicated by pipe $5^a$ to the interior of the float above the mercury. The float rises or falls for every variation in the differential in the pressures, and this indicates the flow by a pointer. To register the amount of flow, a registering device is operated by a clock and it is speeded up or retarded commensurately with the movement of the indicator.

The apparatus in Figs. 1, 3 and 4 is designed to indicate the flow at any moment based upon the difference "$h$" in these static heads, "$h_1$ and $h_2$ (Fig. 5)" and also to measure the quantity of the flow in a given time "$t$," irrespective of the fact that the rate of flow may be frequently varying.

This mechanism for indicating and registering the amount of flow is similar to that which is fully set out in the patent to Ledoux, No. 1,064,748 of 1913, and may be taken as an example of suitable devices which may be employed in connection with my invention taken as a whole. I will now briefly describe this particular apparatus in one of its forms:

In Fig. 3 there is shown a casing 20 providing a closed chamber containing a hollow float 21. This float is a figure of revolution having a cylindrical exterior surface and an interior surface 22 contracting from the bottom of the float, the cross sectional area increasing from zero at the bottom toward the top.

A rod 23, fixed to this float, is controlled by guide rollers 24 and is connected with a counterpoise 25 by a flexible tension member 26 which passes over the sheave 27, fixed on the journal shaft 28.

Mercury contained in the casing constantly seals the interior of the float, the amount of mercury required being reduced by the use of a stationary displacing device 29 adapted to be received within the hollow portion of the float.

The pipe $4^a$ from the "head" compartment 4 communicates with the space in the closed chamber above the mercury and outside of the float 41 and the pipe $5^a$ from the "tail" compartment communicates with the space within the float above the mercury level, as shown.

When water in the conduit compartments 4 and 5 is quiescent the pressures communicated through the pipes $4^a$ and $5^a$ are equal and the float 21 will stand at its highest position with its lower edge touching the surface of the mercury. As the flow through the orifice 6 increases toward the maximum, the pressure communicated through the duct $5^a$ becomes lower than that communicated through the duct $4^a$ and the float moves downward a distance proportionate to the increase in flow, the float being so proportioned that its movement, as controlled by the mercury, shall be in constant ratio to changes in the velocity of flow.

The shaft 28 has fixed thereon, exterior to the casing, a pointer 35, which is movable over a stationary uniformly graduated dial 36 to indicate the position of the float and the rate of flow. The sheave 37 is fixed to the shaft 28 exterior to the casing 20, and a tension member 38 passes over this sheave and supports the rod 39 at one end and the counterweight 34 at the other. This rod carries a dial register 32 having an operating wheel 33 which is driven by a disk 31 rotated at a uniform speed by a suitable clock mechanism 30.

When the fluid, as water, in the compartments 4 and 5, is quiescent by being of uniform static heads and no flow is passing through the orifice, the pressures communicated through the pipes $4^a$ and $5^a$ will be equal, the float will stand at the position of least submergence, with line $a$—$b$ coincident with the surfaces of the mercury within and without the float, the pointer 35 will indicate no flow on the dial, and the wheel 33 will make contact with the center of the disk 31 so that the register is not registering. As the flow through the orifice 6 increases from zero to the maximum, the pressure communicated through the pipe $4^a$ gradually rises above that communicated through the pipe $5^a$, and the resultant or differential pressure effects a depression of the float 21 with a corresponding rise of the mercury within the float as it fills the space within the float to a greater or less extent. As the float is lowered, the register 32 and its operating or traction wheel 33 are moved downward and the latter moves to a greater or less extent away from the center of the clock driven disk 31, and motion is thus given to the traction wheel 33 to operate the register to indicate the volume of flow. This mechanism, therefore, not only indicates the rate of flow, but also the quantity of the flow and which is thereby "measured." The shape of the float 21 is required to be exactly calculated to suit the requirements, but as it is fully described and the calculations therefor are clearly set out in Patent No. 1,064,748 aforesaid, it will not be necessary to describe in detail the special manner of shaping the interior chamber of the float, especially as this invention is not restricted to the particular indicating and registering mechanism which is herein described by way of example of what may be employed in the complete apparatus embodying my invention. It will suffice to say, that the float is so shaped that its vertical movement will be proportional to the changes in velocity of the fluid passing through the orifice 6. As the float rises or falls, the indicator hand 35 and the traction wheel 33, are moved proportionately, the pointer indicating on the dial the rate of flow at any given instant, and the register integrating or registering the quantity of the flow.

I have described my improvements in the form I have found well suited to practical application in the case of feed water heaters, but I do not restrict myself to the details as these may be varied without departing from the spirit of the invention. I neither confine myself to the form of feed water heater nor to the indicator and registering devices, as either or both may be varied or modified, the essential feature of my invention residing in the maintenance of a differential in static heads upon opposite sides of a submerged orifice in the path of flowing water, combined with means for indicating the rate of flow or registering the quantity of flow or both. Moreover, while my invention is especially adapted for use in a feed water heater, it may be employed for various other uses where the quantity of fluid flowing from one place to another is required to be regulated or determined and hence, broadly considered, my invention is not restricted to feed water heaters. It is further to be understood that the "head" and "tail" compartments may be constructed in or made separate from the heater proper, and in this latter form may be combined with any other source of water or fluid to be measured.

Having now described my invention, what I claim as new and desire to secure by Letters Patent, is:—

1. In a feed water heater, the combination of a reservoir compartment at the bottom, a heating compartment at the top, head and tail compartments having communication with each other through a submerged orifice and the "head" compartment communicating at its lower part with the heating compartment, a valve communication between the lower part of the "tail" compartment and the reservoir compartment, and means for registering the amount of flow from the "head" compartment to the "tail" compartment through the submerged orifice in a given time.

2. In an apparatus of the character stated, the combination of two compartments having a communication between them at their lower portions by a submerged opening of normally constant area, one of said compartments being arranged to receive a fluid to be measured and the other arranged to discharge the said fluid after it has passed through the orifice, and means communicating with the respective compartments for indicating the difference in the static heads of the fluid in the respective compartments.

3. In an apparatus of the character stated, the combination of two compartments having a submerged communicating orifice of constant area at their lower parts and one of said compartments being arranged to receive a fluid to be measured and the other arranged to discharge the fluid after it has passed through the orifice, and means having communication with the two compartments and affected by the respective static heads therein for registering the amount of flow through the orifice due to the difference in the static heads of the fluids in the respective compartments.

4. In an apparatus of the character stated, the combination of two compartments having communication with each other at their lower portions by means of a submerged orifice whose bounding edge is of very small thickness, one of said compartments being arranged to receive water to be measured and the other arranged to discharge the measured water, a separate pipe opening into each of the compartments to convey the pressure of the static head therein, and a registering mechanism operated by the differential in the static heads of the two compartments as conveyed by the pipes for registering the amount of water passing from one compartment into the other through the submerged orifice.

5. In a feed water heater, the combination of a reservoir compartment at the bottom, a heating compartment at the top, head and tail compartments at an intermediate level between the reservoir compartment and the heating compartment and having communication with each other through a submerged orifice presenting constant area to the flowing water, said head compartment having communication at its lower part with the heater chamber and said tail compartment having communication with the reservoir compartment, automatic means for controlling the discharge of water from the tail compartment to the reservoir compartment controlled by the level of water in the reservoir compartment, and a registering mechanism operated by the differential in the static heads of the head and tail compartments for registering the amount of water passing between them through the submerged orifice.

In testimony of which invention, I hereunto set my hand.

WM. F. BILYEU.

Witnesses:
R. M. HUNTER,
HORACE D. REEVE.

Copies of this patent may be obtained for five cents each, by addressing the "Commissioner of Patents, Washington, D. C."